United States Patent [19]

Nilles et al.

[11] 3,813,782

[45] June 4, 1974

[54] COLLET ADJUSTING MECHANISM FOR DENTAL HANDPIECES

[75] Inventors: John D. Nilles, Roselle; Frank R. Hruby, Broadview, both of Ill.

[73] Assignee: American Hospital Supply Corporation, Evanston, Ill.

[22] Filed: May 17, 1972

[21] Appl. No.: 253,958

[52] U.S. Cl.......................... 32/26, 90/11 A, 279/53
[51] Int. Cl............................................... A61c 1/08
[58] Field of Search .................... 32/26; 279/53, 63; 90/11 A, 11 D; 128/310

[56] References Cited
UNITED STATES PATENTS
2,653,029  9/1953  Shore....................................  279/53
2,670,963  3/1954  Osborn.................................  279/53
3,496,638  2/1970  Staunt...................................  32/26
3,631,597  1/1972  Lieb.......................................  32/26

Primary Examiner—Hugh R. Chamblee
Assistant Examiner—J. Q. Lever
Attorney, Agent, or Firm—Dawson, Tilton, Fallon & Lungmus

[57] ABSTRACT

A straight handpiece having a rotatable outer sleeve which is capable of limited axial movement into a retracted position. Upon retraction, the sleeve becomes operatively coupled to a drawbar nut which is in turn connected to a collet drawbar projecting forwardly within the spindle of the handpiece. A collet is detachably secured to the front of the drawbar so that upon rotation of the sleeve the collet is retracted or extended to grip or release a dental bur.

16 Claims, 10 Drawing Figures

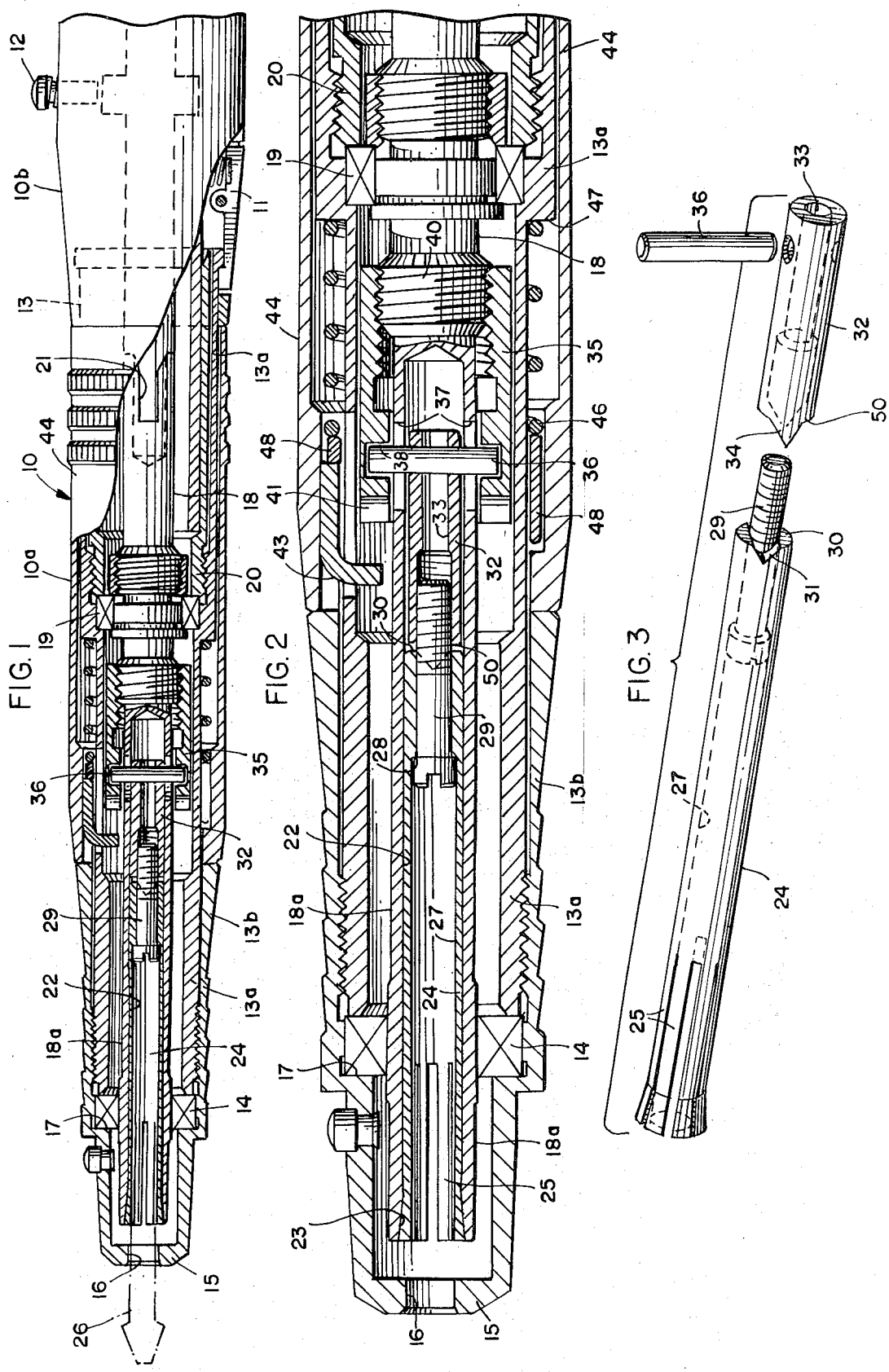

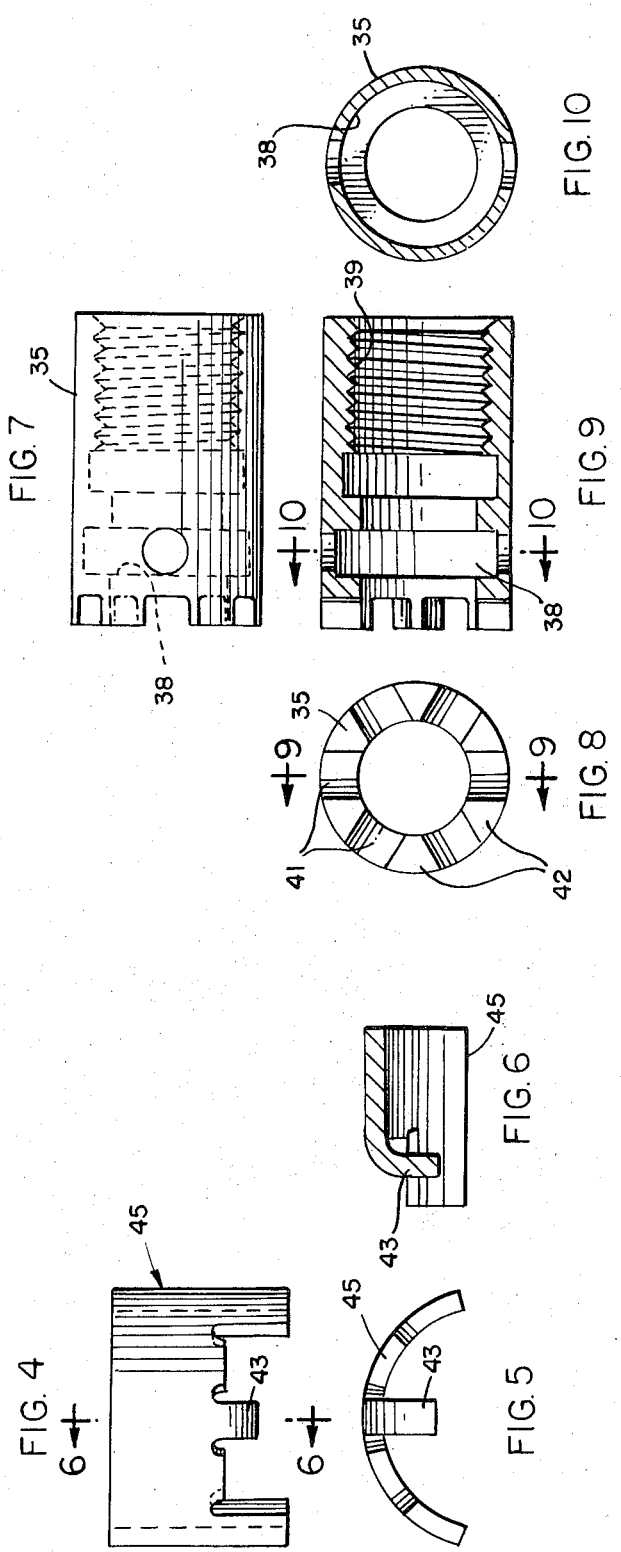

COLLET ADJUSTING MECHANISM FOR DENTAL HANDPIECES

BACKGROUND AND SUMMARY

Dental handpieces equipped with collet chucks for supporting dental burs are commonly used and widely known. Ordinarily, in most straight handpieces such collets are urged axially by suitable spring means to cause the spring jaws of the collet to grip the shank of the bur. Release of the bur is achieved simply by overcoming the force of the spring acting upon the collet. While such a construction has the advantage of simplicity, it is believed apparent that the gripping force exerted by the collet jaws is limited by the strength of the spring and, should the spring become weakened or broken, or should sufficient resistance be encountered during use, there is a substantial danger that the bur may become loosened or released during handpiece operation.

The foregoing disadvantages of prior constructions are overcome by the improved handpiece of the present invention. In the improved construction, the clamping force upon the dental bur is created by manually rotating a collet positioning member, called a drawbar nut, so as to shift the collet axially within the handpiece's hollow spindle. Most desirably, the collet is tapered outwardly or enlarged at its front end so that clamping action occurs as the drawbar nut is rotated to shift the collet rearwardly within the spindle. Such positive rearward displacement of the collet is achieved by restraining rotation of the spindle while at the same time shifting an axially-movable outer sleeve into engagement with the drawbar nut and thereafter rotating the sleeve until the bur is securely fixed in place.

Normally, when the handpiece is either at rest or in operation, the outer sleeve is disengaged from the drawbar nut and, since rearward movement (i.e., movement in a direction opposite to the direction of force of application in normal use of the tool) is required in order to produce engagement, and since the sleeve is disposed well behind the portion of the handpiece which is gripped between the fingers during normal use, no danger of accidental engagement is presented. Further, protection against such engagement arises because the sleeve is maintained in its inoperative position under the force of a firm spring. When adjustment is desired, the force of such spring is manually overcome by shifting the sleeve rearwardly to bring the sleeve's locking element into engagement with any of a plurality of teeth of the drawbar nut.

In one form of the invention the collet structure is divided into a collet proper and a separate collet extension or drawbar, the parts being joined by connecting means in the form of a screw accessible from the front end of the handpiece. Field replacement of the collet may thus be readily achieved. Despite the ease of replacability of the collet, mating wedge-shaped portions of the drawbar and collet insure that tight concentric connection will be maintained between the parts when they are in assembled condition and that no torque in either a loosening or tightening direction will be transmitted through the screw connecting means.

DRAWINGS

FIG. 1 is a side elevational view of a handpiece embodying the collet adjusting mechanism of the present invention, the handpiece being shown partly in section and a typical dental bur being illustrated in phantom.

FIG. 2 is an enlarged fragmentary longitudional sectional view of the portion of the handpiece providing the collet adjusting mechanism;

FIG. 3 is an exploded perspective view showing the collet, drawbar, and connecting means for the handpiece;

FIGS. 4–6 are top, end, and longitudinal sectional views of the finger element for the outer sleeve;

FIGS. 7–10 are side elevational, end, longitudinal sectional, and transverse sectional views of the drawbar nut.

DESCRIPTION

Referring to the drawings, the numeral 10 generally designates a dental handpiece composed of a front attachment section 10a and a rear motor section 10b, the two sections being detachably secured together by a lever latch 11 or by any other suitable connecting means. The motor section 10b may take any appropriate form, reference being made to co-owned U.S. Pat. Nos. 3,386,702 and 3,292,459 in which two such motor units are disclosed. For purposes of the present invention, a main requirement is that the motor or driving section include suitable spindle locking means, shown here in the form of a spring-loaded button and shaft which may be manually depressed to engage and lock the spindle against rotation. Since in other respects the motor section may take any of a variety of forms, and since such units are well known in the art, detailed discussion of such constructions for disclosing this invention is believed unnecessary.

Handpiece section 10a includes an outer casing or sheath 13 which, for purposes of manufacture and assembly, is formed in two sections 13a and 13b. It will be observed from FIG. 1 that sheath portion 13a extends from the extreme rear end of the straight attachment 10a to bearing assembly 14 near the front of the handpiece. Sheath section 13b of threadedly secured to the front end of section 13a and continues forwardly to the extreme front end of the handpiece, terminating in a front wall 15 provided with a central opening 16. It will be observed that the front sheath section 13b is stepped at 17 so that the outer race of bearing assembly 14 will be clamped between the two sections when those sections are threaded together as shown.

Bearing assembly 14 is one of two sets of bearings which rotatably supports a spindle 18 within the cylindrical sheath or casing 13. The other bearing assembly 19 is intermediately located within the sheath and is secured in place by a bearing retainer 20 threadedly mounted within the rear portion of sheath section 13a.

Spindle 18 extends nearly the entire length of the straight attachment 10a. At its rear end, the spindle is provided with a notch 21 so that it may be detachably connected in a conventional manner with the drive shaft of drive means 10b. The front portion 18a of the spindle is provided with an elongated axial bore 22 which flares outwardly at its front end to define a frusto conical surface 23. A tubular collet 24 is slidably received within the forward portion of bore 22 and, as illustrated most clearly in FIGS. 2 and 3, is longitudinally grooved to provide a plurality of circumferentially-spaced forwardly-projecting spring fingers or jaws 25. Each spring finger has an outer surface which flares outwardly and forwardly at its distal end so that in the aggregate such fingers define an outwardly flaring frusto conical surface which mates with the conical inside surface 23 of the spindle. Thus, when the collet is urged rearwardly within the spindle the spring jaws or fingers are cammed inwardly into tight engagement with the shank of a dental bur 26 (FIG. 1), and when the collet is shifted forwardly the clamping force is released, all as well known in the art.

A cylindrical bore 27 extends completely through collet 24 but, as shown in FIG. 2, is reduced at its rear end to define an annular shoulder 28. The shoulder engages the head of screw 29 and limits the extent of rearward movement of the screw within bore 27. Screw 29 is freely rotatable within the collet and, as clearly evident in FIG. 3, the threaded rear portion of that screw projects axially beyond the rear end 30 of the collet. It will also be observed that the cylindrical wall of the collet is provided with a pair of V-shaped notches 31 which are diametrically disposed and which taper forwardly from the annular rear surface 30 of the collet; however, it will be understood that a greater or smaller number of such notches may be provided as desired.

Directly behind the collet, and also disposed within the bore of spindle 18, is a cylindrical drawbar or collet extension 32. The provision of a separate drawbar or collet extension 32, capable of being disconnected from the collet 24, is especially significant where easy replacement of the collet is desired; however, if ease of collet replacement is deemed relatively unimportant, then it is to be understood that the extension 32 may be formed integrally with the collet 24 or may be permanently affixed thereto. In the embodiment illustrated in the drawings, the extension or drawbar has a through bore 33; however, the full extent of the bore is a manufacturing preference, it being necessary only that bore 33 extend axially rearwardly from the front end of the drawbar and that it be threaded to receive the rear end of screw element 29. The screw therefore constitutes connecting means for securing the collet and drawbar in axial alignment. At its front end the drawbar is provided with V-shaped projections 34 which taper forwardly and which are adapted to seat tightly within notches or recesses 31 of the collet. The arrangement of projections and recesses, and the configuration thereof, insure a tight wobble-free concentric interconnection between the collet and drawbar when screw 29 is tightened in place. It will be observed from FIG. 2 that when the collet 24 and drawbar 32 are securely connected together a slight space exists between the collet's end face 30 and the opposing end face 50 of the drawbar, thereby insuring that the projections 34 will be tightly seated within recesses 31 and eliminating any possibility that torque might be transmitted through screw 29 and cause loosening of the screw during operation of the unit.

Drawbar 32 is operatively connected to a collet-positioning member, shown in the form of a drawbar nut 35, by a pin 36 or by any other suitable connecting means. The pin extends transversely through the drawbar and projects laterally through a pair of longitudinally-elongated slots 37 in the wall of spindle portion 18a. The diametrically-disposed slots 37 are dimensioned to permit a range of axial movement of the drawbar (and of the pin connected thereto) without at the same time permitting any appreciable independent rotational movement of the drawbar within cylindrical bore 22.

The ends of pin 36 are received with annular recess 38 in the cylindrical drawbar nut 35 and thereby connect the drawbar and drawbar nut against any appreciable axial movement without preventing relative rotation of the parts. The construction of the drawbar nut is illustrated most clearly in FIGS. 7–10. It will be noted that the rear portion of the tubular nut is internally threaded at 39 to receive the threaded enlargement 40 (FIG. 2) of spindle 18 and that relative rotation of the nut and spindle will cause the nut to move either forwardly or rearwardly along the spindle's axis.

The front end of the drawbar nut 35 is provided with a plurality of radially-extending recesses 41 defined by circumferentially spaced teeth 42 (FIGS. 7–9). In front of the toothed face of the nut is an inwardly-projecting locking finger or element 43 which is fixed to (or formed integrally with) an enlarged external collet-adjustment sleeve or collar 44 (FIG. 2). It has been found that manufacture is simplified if locking finger 43 is formed as part of an arcuate bracket 45 (FIGS. 4–6) which is in turn radially, circumferentially and axially (at least in a forward direction) constrained by the inside of sleeve 44 as by welding or by any other suitable means. A helical spring 46 urges the sleeve 44 into its normal forwardly-disposed position illustrated in FIGS. 1 and 2, the spring being interposed between an enlargement 47 of sheath section 13a and a spring retainer 48 which extends about the sheath and which bears against the rear surface of bracket 45.

Finger element 43 projects into the interior of sheath 13 through a longitudinally-elongated slot 49 in the wall of the sheath (FIG. 2). The width of the slot is only slightly greater than the width of finger 43; therefore, sleeve 44 is axially movable within the longitudinal limits of slot 49 but is restrained against any appreciable rotational movement relative to the sheath.

In operation of the collet adjusting mechanism, a user simply urges sleeve 44 rearwardly into a retracted position wherein the end of locking finger 43 is received within one of the recesses 41 of the drawbar nut 35, thereby locking the sleeve and drawbar nut against independent relative rotation. The user then manipulates spindle locking means 12 and, with the spindle held against rotation with respect to motor section 10b, rotates sleeve 44 (and the entire sheath 13 and drawbar nut 35) with respect to the motor section so that the drawbar nut 35 is threaded one way or the other along spindle enlargement 40. The result is that collet 24 is moved axially with resepct to spindle 18, the direction of relative axial movement depending on the direction of rotation of sleeve 44 with respect to the motor section. The collet is therefore loosened or tightened as desired. After appropriate adjustment has been made, sleeve 44 is released and is returned by spring 46 into the normal extended position shown in the drawings.

While in the foregoing an embodiment of the invention has been disclosed in considerable detail for purposes of illustration, it will be understood by those skilled in the art that many of these details may be varied without departing from the spirit and scope of the invention.

We claim:
1. In a handpiece having a casing, a spindle rotatably mounted therein having a tubular front portion, a collet slidably mounted within the front portion of said spin- dle, and means for locking said spindle against rotation, the improvement in which a sleeve is slidably mounted upon said casing for movement between extended and retracted positions, a drawbar within said spindle releasably connected to said collet at the rear end thereof, a drawbar nut externally and threadedly mounted upon said spindle, means interconnecting said drawbar and drawbar nut, and means provided by said sleeve and selectively engageable with said drawbar nut for locking the same against independent relative rotation only when said sleeve is shifted into its retracted position.

2. The structure of claim 1 in which spring means is provided for urging said sleeve into its normally extended position.

3. The structure of claim 1 in which said casing is rotatably connected to a motor section having drive means operatively connected to said spindle, said means for locking said spindle being mounted on said motor section, said sleeve and casing being connected for simultaneous rotation relative to said motor section for selectively adjusting said collet when said spindle is in locked condition.

4. The structure of claim 1 in which said sleeve is forwardly disposed when in said extended position and rearwardly disposed when in said retracted position.

5. In a handpiece having a casing, a spindle rotatably mounted therein having a tubular front portion, a collet slidably mounted within the front portion of said spindle, and means for locking said spindle against rotation, the improvement in which a sleeve is slidably mounted upon said casing for movement between extended and retracted positions, a drawbar within said spindle releasably connected to said collet at the rear end thereof, a drawbar nut externally and threadedly mounted upon said spindle, means interconnecting said drawbar and drawbar nut, and means provided by said sleeve and selectively engagable with said drawbar nut for locking the same against independent relative rotation only when said sleeve is shifted into its retracted position, said last-mentioned means comprising a finger element projecting radially inwardly from said sleeve into said casing, said finger element being engageable with said nut for locking said sleeve and nut against relative rotation when said sleeve is in its retracted position.

6. The structure of claim 5 in which said nut is provided at its front end with a plurality of teeth defining a series of circumferentially-spaced recesses, said finger element being receivable in each of said recesses for locking said sleeve and nut together when said sleeve is in its retracted position.

7. In a handpiece having a casing, a spindle rotatably mounted therein having a tubular front portion, a collet slidably mounted within the front portion of said spindle, and means for locking said spindle against rotation, the improvement in which a sleeve is slidably mounted upon said casing for movement between extended and retracted positions, a drawbar within said spindle releasably connected to said collet at the rear end thereof, a drawbar nut externally and threadedly mounted upon said spindle, means interconnecting said drawbar and drawbar nut, and means provided by said sleeve and selectively engageable with said drawbar nut for locking the same against independent relative rotation only when said sleeve is shifted into its retracted position, said collet being tubular and having an enlarged forward end, said collet being connected to said drawbar by means of a screw rotatably mounted at the rear end of said collet and threadedly connected to said drawbar, said screw having a head disposed within said tubular collet and accessible from the open front end thereof, whereby said collet may be detached from said drawbar and removed from said handpiece by unthreading said screw.

8. The structure of claim 7 in which said drawbar and collet having adjacent ends provided with at least one interfitting notch and a complementary projection for interlocking the same against relative movement when said screw is tightened.

9. The structure of claim 8 in which said interlocking projection and notch are generally V-shaped in configuration.

10. The structure of claim 7 in which said collet has a rear end wall having at least one V-shaped notch tapering forwardly therefrom, said drawbar having a V-shaped projection tapering forwardly therefrom and received within said notch for securing said collet and drawbar against relative movement when said screw is tightened.

11. A handpiece having a casing, a spindle rotatably mounted therein and provided with a tubular front portion, a collet slidably mounted within the front portion of said spindle, and means for selectively locking said spindle against rotation, wherein the improvement comprises a generally cylindrical sleeve slidably mounted upon said casing for movement between a forwardly extended position and a rearwardly retracted position, a drawbar within said spindle releasably connected to the rear end of said collet, a drawbar nut externally and threadedly mounted upon said spindle, means interconnecting said drawbar and drawbar nut, means mounted upon said sleeve and selectively engageable with said drawbar nut for locking said sleeve and nut against independent relative rotation when said sleeve is shifted into its retracted position, and spring means normally urging said sleeve forwardly into its extended position, said first-mentioned means comprising a finger element projecting radially inwardly from said sleeve and engagable with said nut for locking said sleeve and nut against relative rotation when said sleeve is retracted.

12. The structure of claim 11 in which said nut is provided at its front end with a plurality of teeth defining a series of circumferentially-spaced recesses, said finger being receivable in each of said recesses for locking said sleeve and nut together when said sleeve is retracted.

13. The structure of claim 11 in which said casing is rotatably connected to a motor section having drive means operatively connected to said spindle, said means for locking said spindle being mounted upon said motor section, said sleeve and casing being connected for simultaneous rotation relative to said motor section for selective adjustment of said collet.

14. The structure of claim 11 in which said collet is tubular and has an externally enlarged forward end, said collet being connected to said drawbar by means of a screw rotatably mounted at the rear end of said collet and threadedly connected to said drawbar, said screw having a head disposed within said tubular collet and accessible from the collet's open front end, whereby, said collet may be readily detached from said drawbar and removed from said handpiece by unthreading said screw.

15. The structure of claim 14 in which said drawbar and collet have adjacent ends provided with complementary notches and projections for interlocking the same against relative movement when said screw is tightened, said projections and notches being generally V-shaped in configuration.

16. The structure of claim 14 in which said collet has a rear end wall having at least a pair of V-shaped notches tapering forwardly therefrom, said drawbar having V-shaped projections tapering forwardly and received within said notches for securing said collet and drawbar against relative movement when said screw is tightened.

* * * * *